United States Patent
Ashton et al.

(10) Patent No.: US 7,315,018 B2
(45) Date of Patent: Jan. 1, 2008

(54) MACHINE TOOL ANALYSIS DEVICE AND METHOD

(75) Inventors: Sharon Ann Ashton, Bristol (GB); Victor Gordon Stimpson, Avening (GB); Jonathan Paul Fuge, Bristol (GB); David Roberts McMurtry, Dursley (GB)

(73) Assignee: Renishaw PLC, Gloucestershire (GB)

( * ) Notice: Subject to any disclaimer, the term of this patent is extended or adjusted under 35 U.S.C. 154(b) by 177 days.

(21) Appl. No.: 10/535,716

(22) PCT Filed: Dec. 18, 2003

(86) PCT No.: PCT/GB03/05538

§ 371 (c)(1),
(2), (4) Date: May 20, 2005

(87) PCT Pub. No.: WO2004/056528

PCT Pub. Date: Jul. 8, 2004

(65) Prior Publication Data
US 2006/0020422 A1 Jan. 26, 2006

(30) Foreign Application Priority Data
Dec. 19, 2002 (GB) .................. 0229459.3

(51) Int. Cl.
*H01J 40/14* (2006.01)
*G08B 21/00* (2006.01)

(52) U.S. Cl. ...................... 250/221; 340/680

(58) Field of Classification Search ................ 250/221, 250/222.1; 72/1–4, 14.3, 21.1, 21.3; 100/348; 340/679, 680
See application file for complete search history.

(56) References Cited

U.S. PATENT DOCUMENTS

| 4,966,460 A | 10/1990 | Kahley ..................... 356/640 |
| 5,004,930 A | 4/1991 | Gremaud et al. ....... 250/559.14 |
| 5,164,995 A | 11/1992 | Brooks et al. ............. 382/152 |
| 5,940,787 A * | 8/1999 | Gelston ..................... 702/134 |

FOREIGN PATENT DOCUMENTS

EP 1 050 368 A1 11/2000

* cited by examiner

*Primary Examiner*—Thanh X. Luu
(74) *Attorney, Agent, or Firm*—Oliff & Berridge, PLC

(57) ABSTRACT

The invention relates to a device and method for analysis of a tool (50) e.g. used on a machine tool. A tool detector (5) includes a light emitter (12) and a light receiver (34). Tool (50) when progressed into a beam (20) of light emitted from the emitter (12) will cause a signal from the receiver to change. Circuitry (32) includes a digital signal processor which processes the signal from the receiver and produces an output only if the signal conforms to a predetermined condition. Preferably this predetermined condition could be e.g. a characteristic shape of the signal from the receiver, a change in a value derived from a succession of such signals or a change in the minimum or maximum values of a succession of signals from the receiver.

17 Claims, 8 Drawing Sheets

MACHINE TOOL ANALYSIS DEVICE AND METHOD

This invention relates to a device and method usable for analysis of a tool during its use with a machine tool, in particular but not exclusively for determination of the position of a tool.

Toolsetting devices for determining the position of a tool, which use a break beam system are known. EP1050368 A1 describes in detail one system which has a light transmitter and receiver. The transmitter produces a beam of light and a receiver has circuitry which produces a signal when obstruction of the beam is detected. When a predetermined level of beam obstruction e.g. 50% is reached then the signal strength from the receiver is reduced such that a trigger is produced. The trigger occurs when a tool is present in the beam path.

A toothed cutting tool has to be rotated in order to find its cutting diameter. Usually it will have at least two teeth, one of which may be taller than the other and so that tooth will circumscribe a larger diameter than the other(s). When the tool is brought into the beam path the tallest tooth may be at any point and so the repeatability of the trigger will vary. For example if a tool rotating at 1500 rpm is moving towards the beam at 6 mm per minute then the feed per revolution would be 6÷1500 which equals 0.004 mm. So, the repeatability of the trigger will be no better than 4 microns because the largest tooth may break the beam anywhere in that feed per revolution distance. The feed per revolution of the measurement limits the speed at which the tool can be driven into the beam and so slows the detection rate. Detection speed needs to be maximized for quick operation of the machine tool, whilst repeatability needs to be maximized also, requiring slow feed rates.

One known way to increase detection speed is to move the tool quickly toward the tool setting device and once detected to back off and then move in slowly to determine the tool's position. This procedure, whilst saving some time, is still relatively time consuming.

According to a first aspect the present invention provides a tool analysis device for use on a machine tool comprising a light emitter and a light receiver, the light receiver in use receiving light from the emitter and producing a signal indicative of the amount of light being received, wherein the device further comprises a converter for providing data having a numerical representation of the signal produced by the receiver and comprising also a processor for processing that data and for producing an output when the data conforms to a predetermined condition.

The processor may be a digital signal processor (DSP) operative to process the data according to an algorithm.

According to a second aspect the invention provides a method for processing an analogue signal resulting from light falling on a light receiver of a tool analysis device for use on a machine tool, comprising the steps of:
 converting the analogue signal into data having a numerical form which represents the signal; and
 processing the data according to an algorithm.
 Preferably the method provides a further step of:
 producing an output signal when instructed by the algorithm when the data conforms to a predetermined condition.
 Preferably the method employs a DSP to process the data and the algorithm is executed within the DSP.

According to both aspects the predetermined condition may be the data obtained when the light falling on the light receiver is altered e.g. in such a way that the tooth of a tool momentarily moves into and then out of the light falling in the light receiver, or a series of such events that conform to a predetermined pattern. The pattern could be deviations in the amount of that light such or a definable change in the magnitude of those deviations, e.g. a decrease in magnitude from one deviation to the next or a maximum followed by a minimum followed by another maximum in that magnitude.

Embodiments of the invention will now be described in detail with reference to the drawings, wherein.

Figure 1:
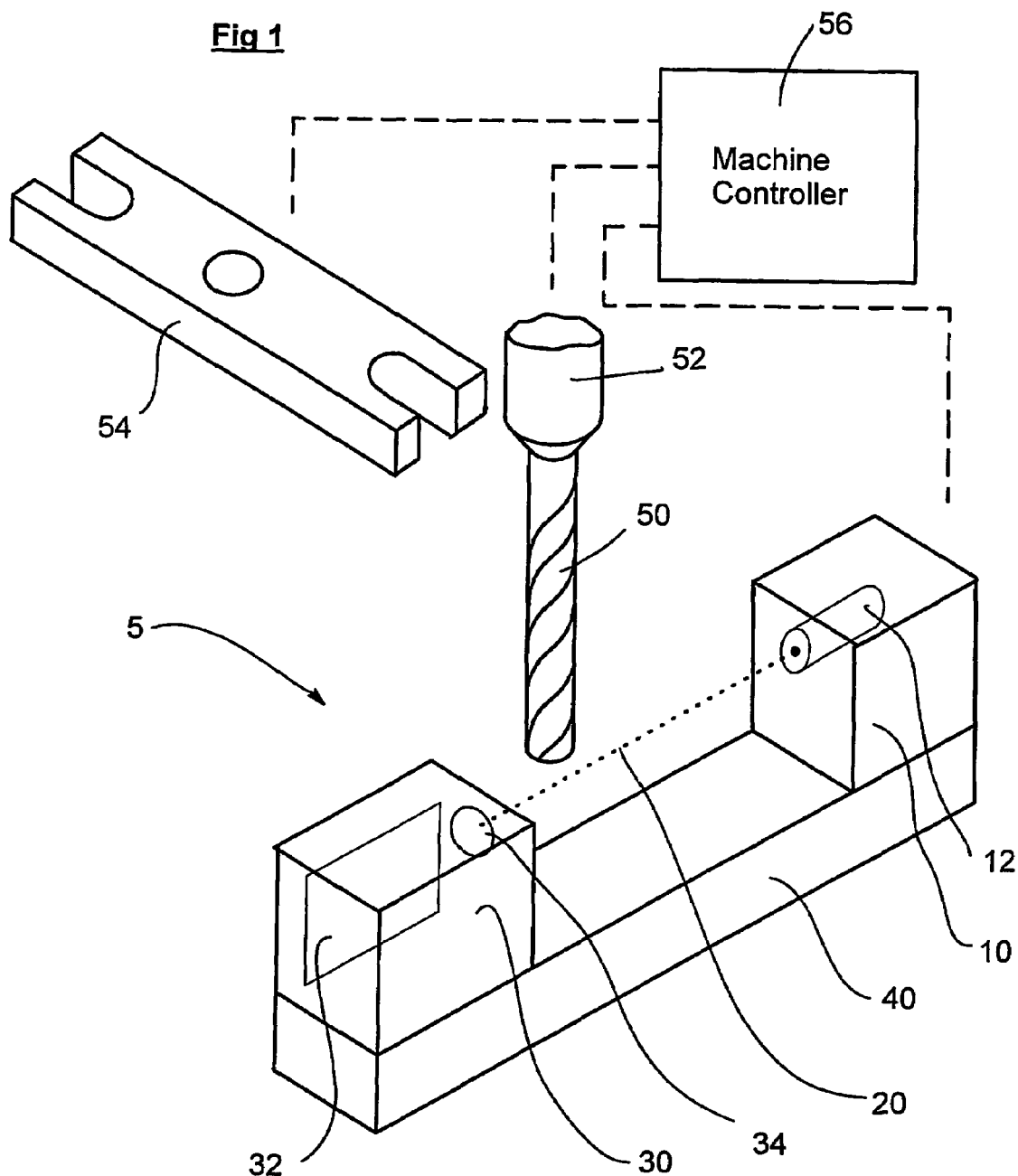
FIG. 1 shows a break beam type tool detector and associated components.

FIG. 1 shows a break beam type tool detector 5. The detector is suitable for use on a computer controlled machine tool (usually called a CNC) having a machine controller 56, a tool 50, a toolholder 52 and possibly an automatic tool changer 54.

Figure 2:
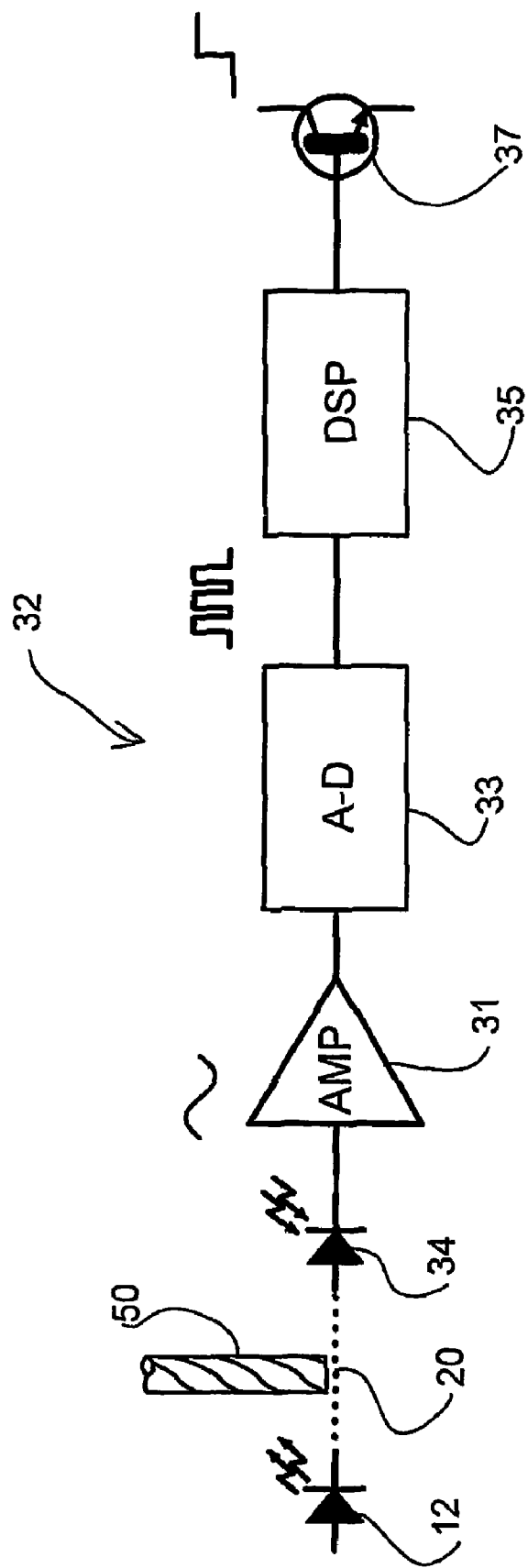
FIG. 2 shows a schematic representation of elements of the break beam tool detector shown in FIG. 1.

The tool detector 5 includes a laser light transmitter 12 (IR light is used in this instance), at transmitter portion 10, a light receiver 34 at receiver portion 30 and a base 40 for mounting the transmitter and receiver portions. A light beam 20 is created in use which can be obstructed by the tool 50. Additional circuitry 32 is used also for processing the signal issued by the light receiver 34. Whilst the circuitry is shown in the receiver portion 30 some or all of it may be located off the detector, e.g. as a PC interface card. FIG. 2 shows the circuit 32 in more detail. A photodiode is used as the light detector 34. The analogue signal from the photodiode is amplified at amplifier 31 and is then sampled by an analogue to digital converter (A-D) 33. The sample rate is approximately 45 KHz, but need not be that value. A sample is called for by the digital signal processor (DSP) and this processor runs a continuously looping algorithm which calls for a sample at each loop. The DSP is capable of parallel processing and so performs its tasks very quickly. The algorithm used performs the steps illustrated in FIG. 3 and can be reset. In practice background noise will be present and this will be sampled by the DSP. As the beam is obstructed e.g. by the tool, the signal from the receiver 34 will change and thus will, in turn be sampled also. The algorithm can cause an output when the data conforms to a predetermined condition.

Prior to tool detection a calibration pin is detected by the detector. A pin, in this instance similar in size to the tool to be detected is brought into the beam 20 by a program running in the CNC at a feed rate of approximately 4 mm/sec. The pin may be rotating or non-rotating. The light receiver output will follow a curve similar to that shown in FIG. 4. That graph shows the receiver output in volts V, versus time. A straight line n represents the nominal upper voltage of the receiver output with no beam obstruction. As the pin is brought into the beam an oscillation in output V is observed due to diffraction, then as less and less light from the beam falls on the receiver the voltage reduces along curve c and eventually drops to zero. In particular a noticeable increase p in voltage is observed as the beam begins to be obstructed. The voltage during this calibration is processed by the DSP and turned into digital information representing the analogue output of the light receiver 34. The curve is stored as a digital representation in the memory of the DSP and is referred to below as the calibration curve c. More than one curve can be stored.

Figure 5:
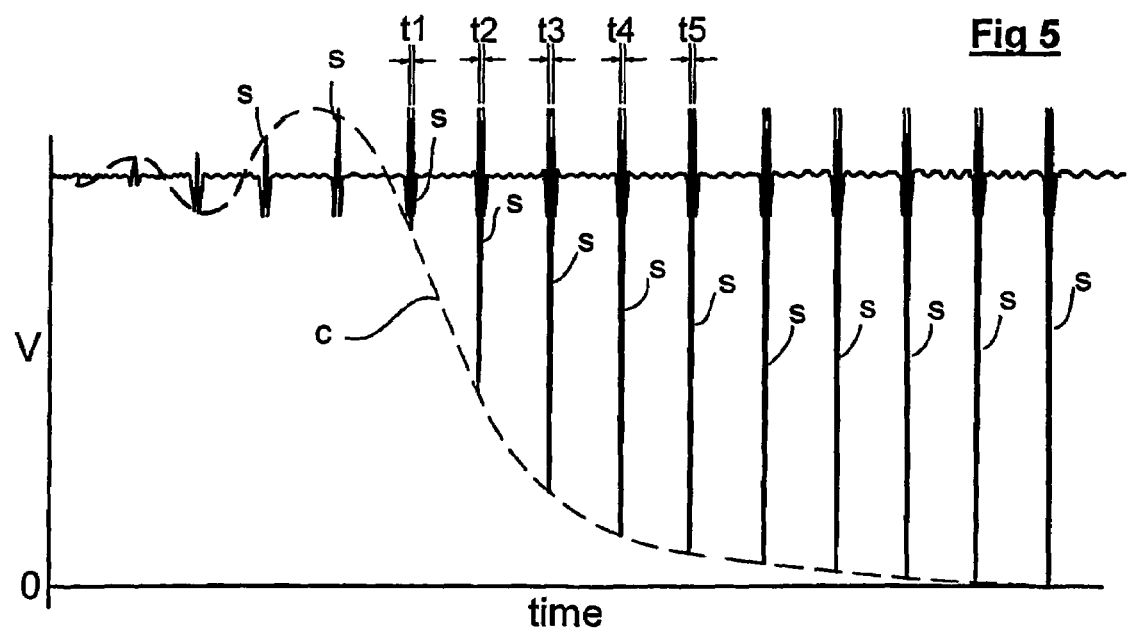

When the tool 50 is brought into the beam at about the same feed rate as the pin, whilst it is rotating, it will have teeth which temporarily obscure a part of the beam and these teeth cause voltage deviations s in the signal from the receiver 34 as shown in FIG. 5.

It has been found that the minima and maxima of the deviations shown in FIG. 5 lie approximately on the calibration curve c. The graph shown in FIG. 5 is of an idealized form, and in practice far more interference or noise is observed than has been shown. However, the voltage deviations shown will be present despite the noise. For simplicity few deviations are shown, however, in practice there may be many more than has been shown because the tool will be rotating much faster than is exemplified and consequently many more interruptions to the beam will be observed. These additional deviations will also have minima and maxima which lie approximately on the calibration curve c.

The deviations present will differ in shape depending on the tool type but the minima and maxima will still lie on the calibration curve c.

Figure 6:
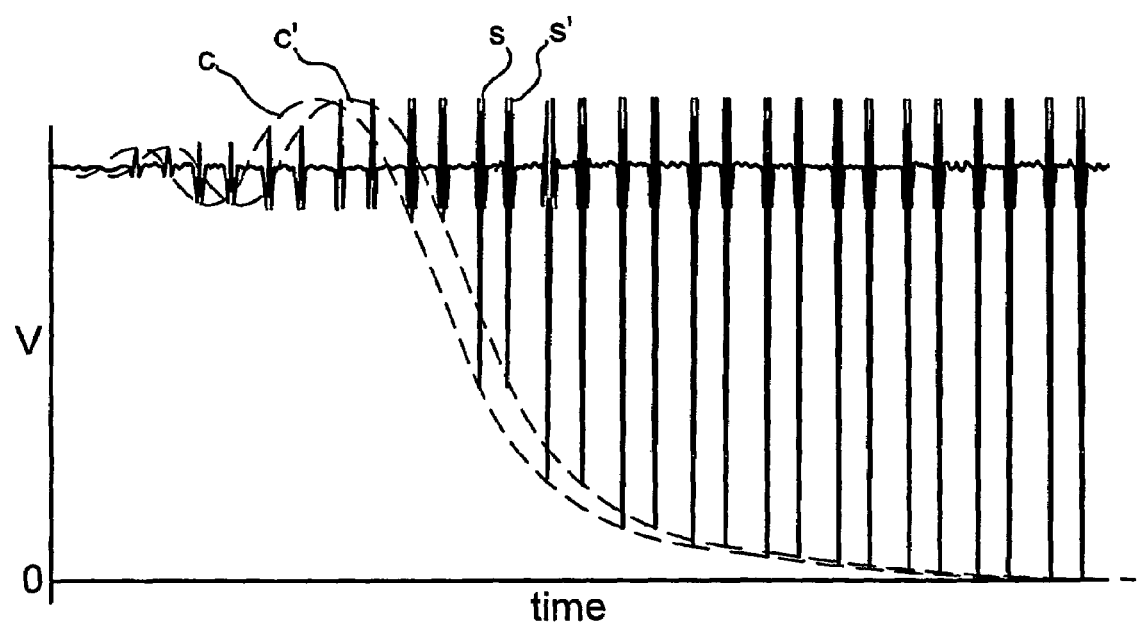

Another set of deviations is shown in FIG. 6. This graph illustrates the voltage deviations obtained when a two tooth cutting tool having one tooth taller than the other is brought into the beam. In this instance two sets of voltage deviations s and s' are formed, s' lagging behind s. Each of these sets s and s' has minima and maxima which lie on one of the respective calibration curves c or c'.

Figure 7:
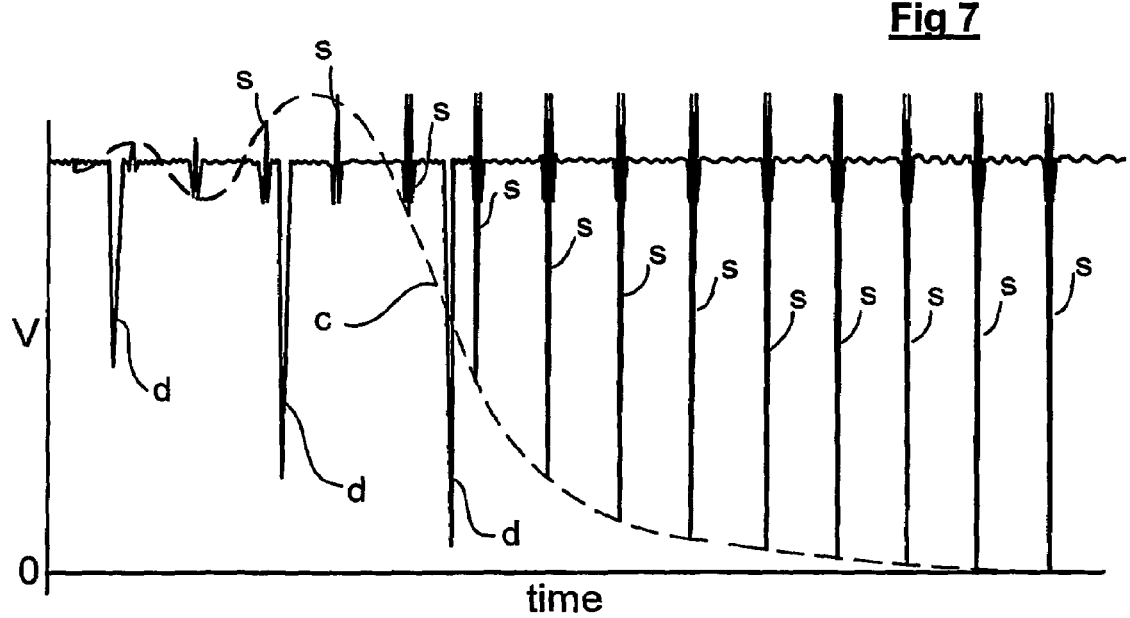

Yet another set of deviations is shown in FIG. 7. As well as the deviations s this graph illustrates coolant drips etc d which occur when the beam 20 is obscured by material like machine coolant or swarf. These spurious signals d do not conform to any pattern or curve and occur randomly.

In each of the graphs of FIGS. 5,6 and 7 when background noise and spurious signals d are ignored in favor of a recognisable set of voltage deviations s which are processed by the DSP.

Figure 3:
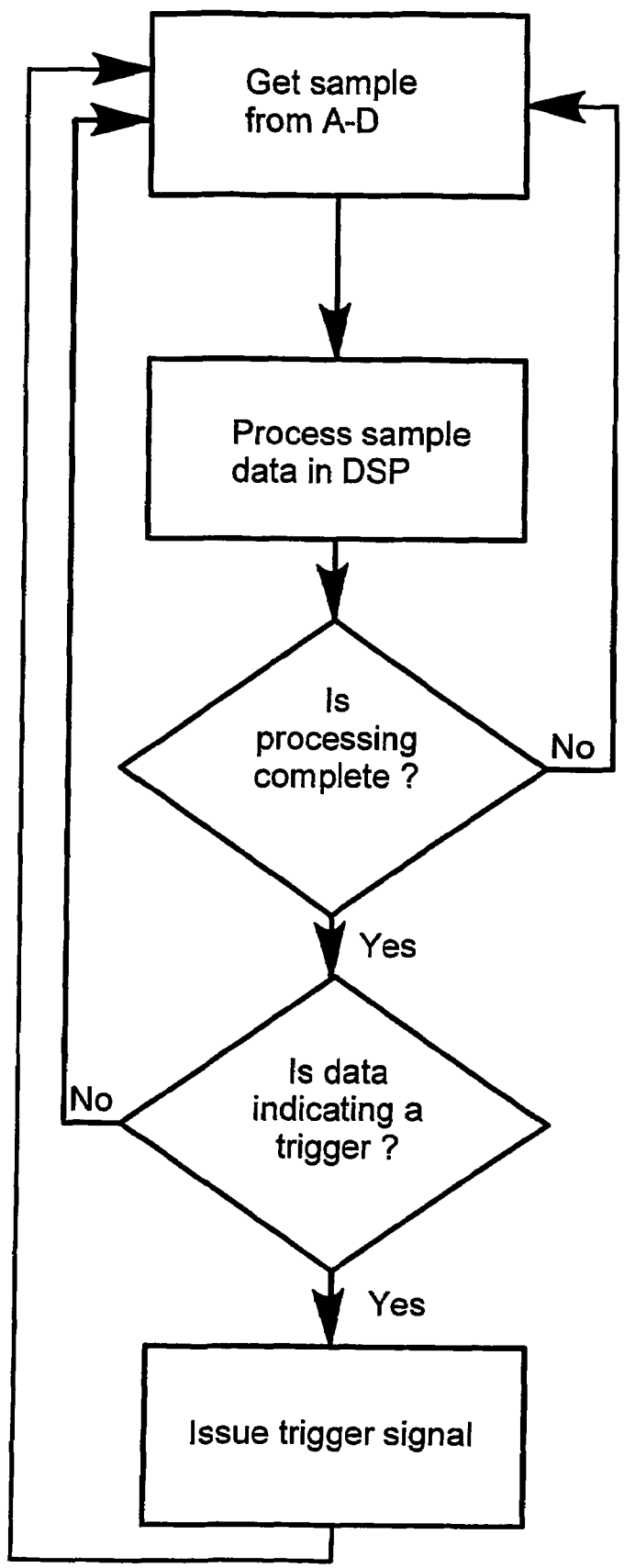
FIG. 3 shows a flow diagram of an algorithm for use with the invention.

Now, in this embodiment of the invention the voltage signals from the light receiver are conditioned using the circuitry shown schematically in FIG. 2. Signal amplifier 31 amplifies the analogue signal and passes it to the A-D 33. The A-D in this example can operate at a 96 KHz sample rate but as illustrated in FIG. 3 is driven to collect each sample by the downstream DSP 35. Once processed the sampled signals can be used e.g. to activate an output in the form of a trigger switch 37 e.g. to indicate that the edge of the tool has been found.

In this example the predetermined condition is the data obtained when the beam is obstructed by the tool.

The processing of the digitised signal by the DSP can be carried out in a number of ways. The DSP is an ideal device for carrying out such processing because it is very fast and processes the data in real time, thus enabling short response times.

Figure 4:
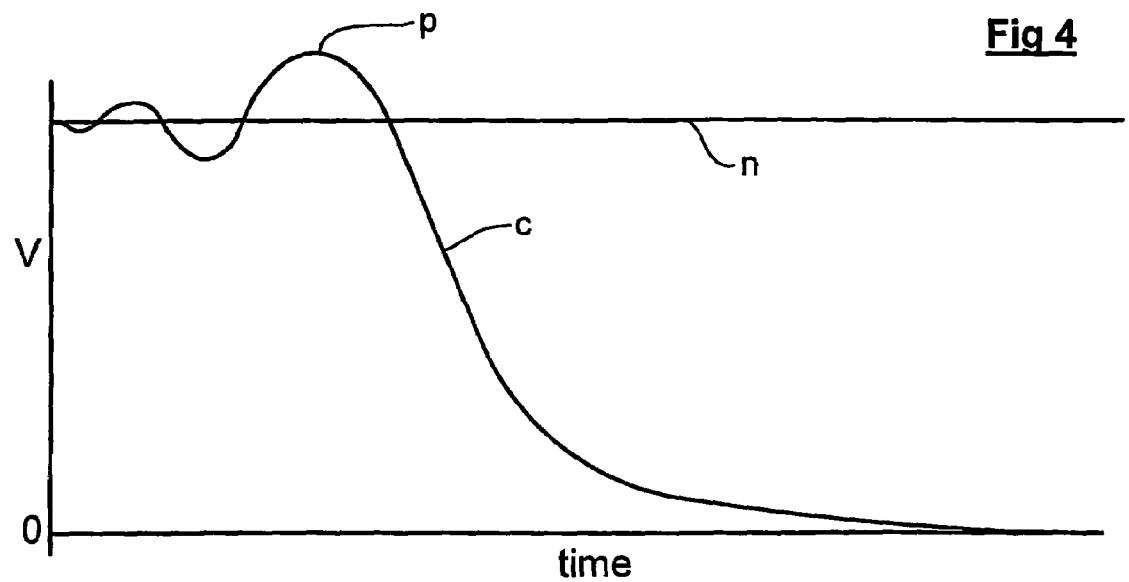
FIGS. 4, 5, 6, 7 and 8 show simplified graphical representations of signals produced during use of the detector shown in FIG. 1.

One method of processing the sampled data involves deriving a polynomial e.g. cubic expression for the calibration curve c shown in FIG. 4 and fitting, within tolerances, the minima and the maxima of the voltage deviations s obtained in use of the device to that curve. If four minima and maxima values (more could be used) have been identified which fit to the curve within a predetermined time period then the DSP sends a trigger signal to switch 37 so that a 24 v skip signal can be issued to the machine controller 56. The machine controller can use this signal to determine the position of the tool's edges and thereby its effective cutting path.

Alternatively an approximate straight line or polynomial can be generated using the minima as points on that line. No calibration curve(s) is (are) required but rather, a threshold value can be predetermined and when the straight line or polynomial line is calculated to have crossed (or will cross when extrapolated) that threshold then a trigger signal can be generated. The calculations necessary for the line generation again can be performed in the DSP. The accuracy of the estimated threshold crossing point can be improved if more than the minimum number of points are used. A gradient method can be used to determine minima or maxima and hence determine a threshold value. The increase p can be used also to predict a threshold crossing if required.

Drips or similar obstructions to the beam may give rise to false readings during the use of the technique mentioned immediately above. There are a number of ways in which these false readings can be ignored. One such way is to look for periodic voltage deviations from the receiver 34 and then to open time periods around the time when another deviation is expected. Only in this period will digitising of the signal take place. Thus, the chance of a drip occurring within that period will be relatively small.

Another way to reject drips etc is to reject any voltage deviation minima or maxima whose values lie outside a band within which the next successive value for a predetermined curve would be expected.

The above examples for processing of sampled data can be used for non-rotating or rotating tool detection including the detection of the lengths of rotating drills etc which, when brought into the beam on axis may appear to be non-rotating.

Figure 8:
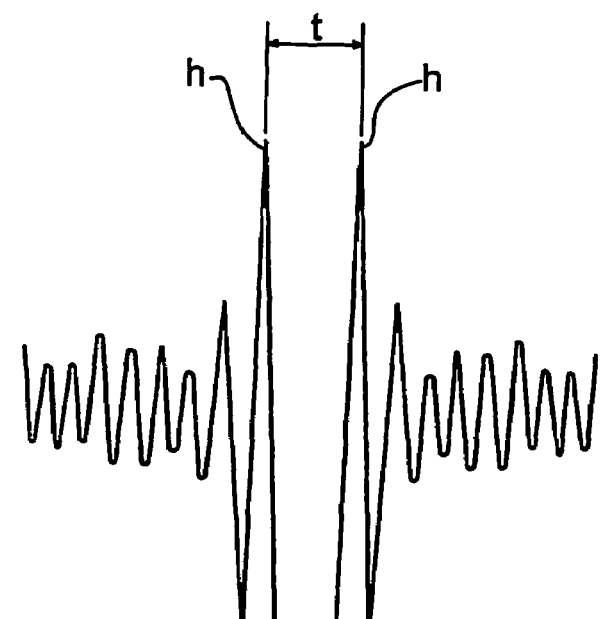

Another method of processing the sampled data from the edge of a rotating tool is to look for voltage deviations which have a distinctive character. A detail of one such voltage deviation is shown in FIG. 8. For certain signals, the deviation of the voltage when a cutting tool tooth obstructs the beam has a distinct shape caused by optical effects. The shape occurs only when a rotating part enters and leaves the beam. This distinctive shape can be detected by operating an algorithm in the DSP. This algorithm will look for the relatively high amplitude maximum h followed by a relatively high amplitude minimum s followed by another relatively high amplitude maximum h. The minimum of that deviation and the minimum of subsequent similar deviations can be identified as tooth edge deviations and can thus be used to form a curve which can be fitted to a polynomial. No calibration curve(s) is (are) required for this method.

The characteristic shape mentioned above may be a min-max-min as well as the max-min-max described.

A method of rejecting drips when detecting rotating tools is to ignore voltage deviations which do not have the expected distinctive character i.e. either min-max-min or max-min-max e.g. as shown in FIG. 8.

The techniques mentioned above for determining the position of a tool rely on the calculation of the minima and maxima of the voltage deviations s which occur when a tooth obstructs the beam. There are a number of well-known techniques for estimating the zero slope part of a curve from points on either side of minima or maxima which may be used.

Figure 9:
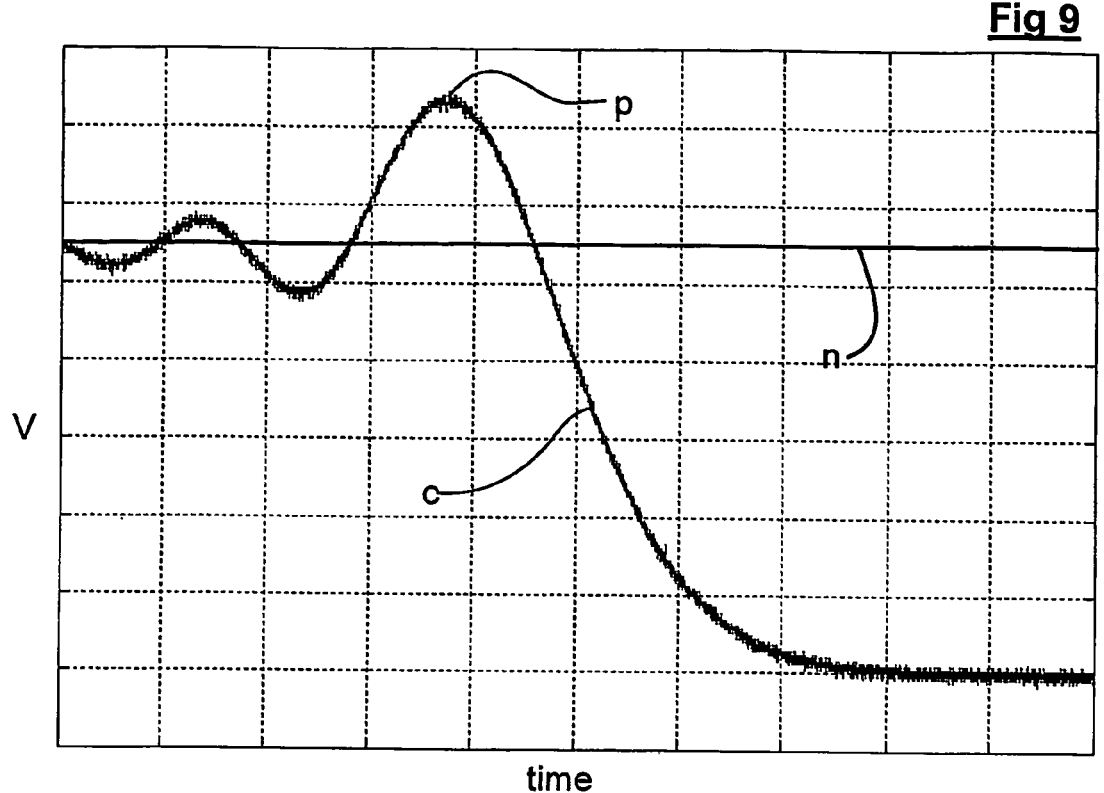
FIGS. 9-14 show graphs of actual output of a light receiver versus time obtained during use of a detector of the type shown in FIG. 1.

FIG. 9 shows a graph of actual signals sampled from the output of a tool detector of the type shown in FIG. 1. In this graph one square along the V axis represents 1 volt and one square along the time axis represents approximately 25 msec.

A calibration pin has been brought into the beam and has caused the characteristic curve c which is shown in FIG. 4 in simplified form. The nominal voltage n is 5.5 v and the receiver voltage drops to zero when fully obstructed.

Figure 10:
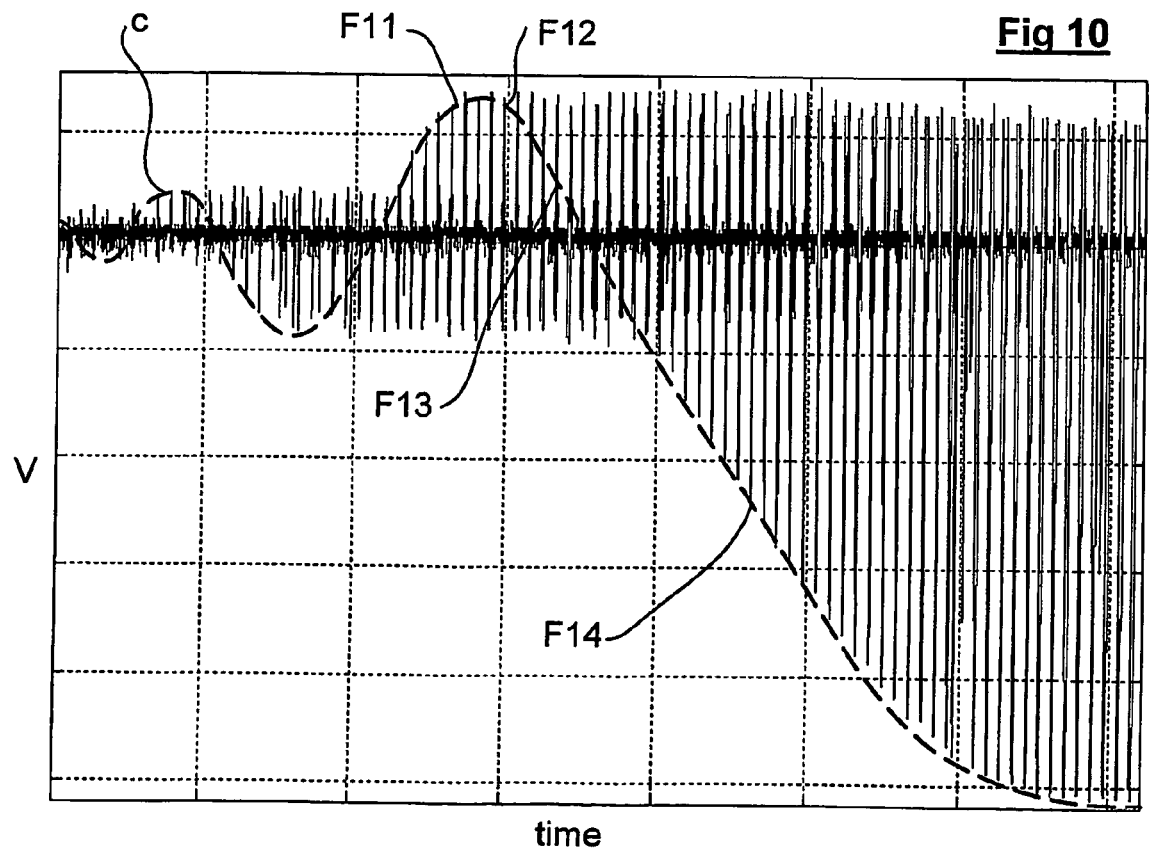

FIG. 10 shows a graph of actual signals sampled from the output of a tool detector. In this graph a rotating tool (a 12 mm slot drill) is brought into the detector beam and its teeth have produced the signal as they obstruct the beam. The graph squares represent 1 volt and about 120 msec. Superimposed on the graph is a the curve c which approximates to the curve c in FIG. 9.

Various typical shapes of the data plots at points F11 to F14 along the curve are shown in more detail in FIGS. 11 to 14 respectively. In each of the graphs shown in FIGS. 11-14 one square represents 0.5 v and about 5 msec.

Figure 12:
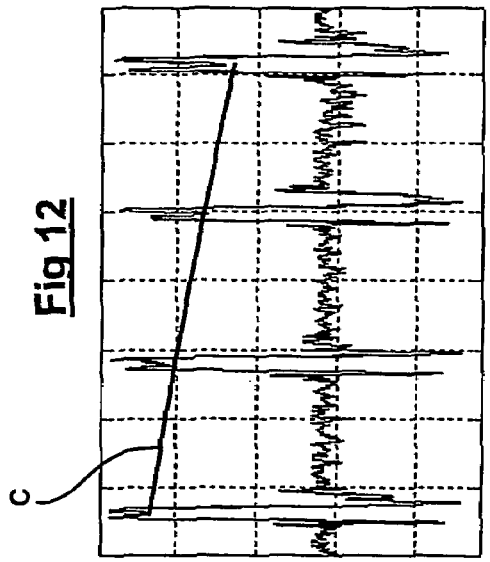
Figure 14:
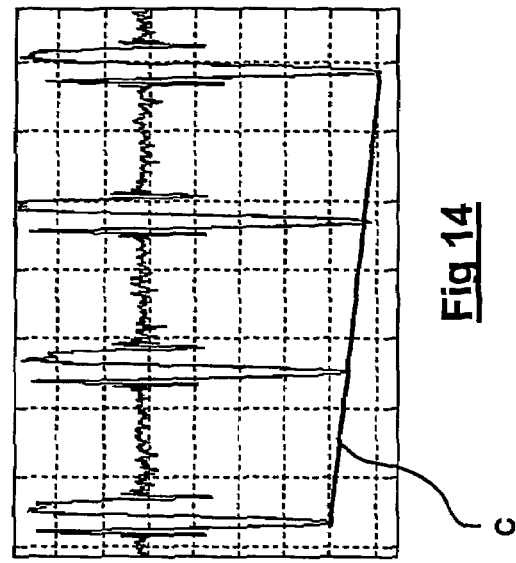
Figure 11:
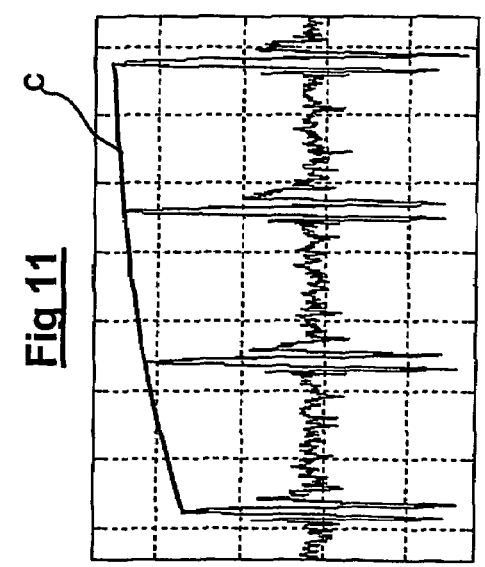
Figure 13:
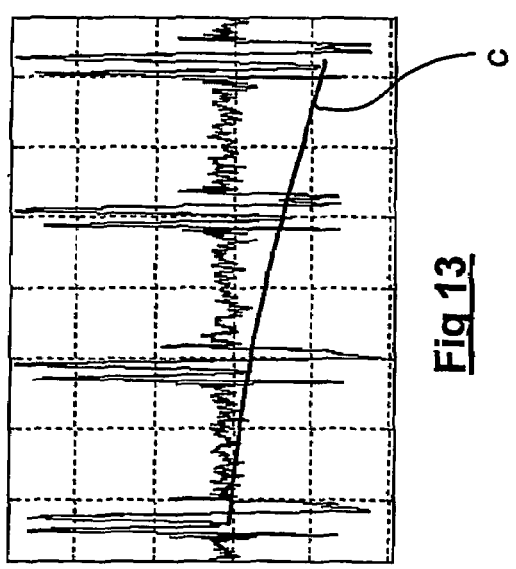

In FIG. 12 the obstruction signal is still in its oscillatory phase and has a min-max-min shape. In FIG. 12 a trough develops in the max and thus a min,max,min,max,min shape develops. In FIG. 13 that middle trough becomes bigger. At FIG. 14 the trough is larger than the other signals. The signal in FIG. 14 is the max-min-max signal referred to above which has the distinctive shape that can be recognised and can be distinguished from other spurious signals.

Tools which are brought into the beam along their axis of rotation e.g. drills brought in tip first also have this characteristic "c" shape.

Thus it can be seen that the voltage deviation that is detected by the algorithm in the DSP develops as the tool is progressed into the beam. As mentioned above, there are many ways in which the sampled data can be used to determine a trigger point.

The max-min-max signal shown in FIG. 8 changes progressively as the tool moves into the beam. The time t between the max peaks of the max-min-max increases as the tool progresses into the beam. The time t is shown also in FIG. 5 as t1,t2,t3,t4,t5 etc. This increase (or decrease if the tool is leaving the beam) can be determined by the DSP and used to determine where the tool is in relation to the beam. Thus a trigger threshold can be set when a certain time t is reached for the recognisable max-min-max signal shown in FIG. 8. If the rate of increase of t is determined as the tool is progressed then with a known velocity of tool relative to the beam it will be possible to determine other tool characteristics such as tool geometry. If the change in t is determined for a given travel of the tool then, with constant tool angular velocity, the diameter of the tool can be determined.

It has been found that the curve c shown in FIGS. 4-14 follows the distinctive shape shown, even if the tool or obstruction in the beam is not rotating as it enters the beam. Thus such a shape can be detected by the algorithm in the DSP, e.g. by determining progressive min values (s in FIG. 8). It is not essential that a calibration curve (c in FIG. 4) is generated prior to tool analysis because the curve will follow a recognisable path of min values.

Thus it can be seen that there are a number of ways in which data derived from receiver 34 can conform to a predetermined condition indicative of a tool present in the beam 20 e.g.:
  a number of repeated signals e.g. max,min,max which have a characteristic profile;
  the shape of curve c may conform to a calibration curve or may have an expected shape;
  the time t (FIG. 8) may vary such that a prediction of the position of the tool can be made; or
  successive peaks h (FIG. 8) may be encountered.

A DSP has been utilised in the embodiment described, however many alternatives exist. Processing of the digitised signal could be carried out using e.g: a Field-Programmable Gate Array, an application-specific integrated circuit or a general-purpose microprocessor e.g. a PIC or a PC based system.

The tool detector is shown as a break beam type, but could be a reflective type.

Any edge of a tool can be detected e.g. side or end. Usually a calibration curve will be generated for each edge which is to be detected, but such a curve is not essential for edge detection.

The graphs show generally voltage output of a light receiver but any other variable can be employed. The voltage etc may not drop fully to zero, particularly if a very small tool is to be detected and where only a portion of the beam is obstructed.

Detection can be made when the tool is coming out of the beam as well as going into the beam. In such circumstances the effects detailed above will be reversed. Tools or other items to be detected need not be rotating to be detected.

As described above the minima or maxima of voltage deviations or deviations of variables can be fitted to a curve or simply used to plot a line. In either instance a trigger point equivalent to a voltage (etc) threshold can be set.

The invention claimed is:

1. A tool analysis device for use on a machine tool comprising a light emitter and a light receiver, the light receiver in use receiving light from the emitter and producing a signal indicative of the amount of light being received, wherein the device further comprises a converter for providing data having a numerical representation of the signal produced by the receiver and comprising also a processor for processing that data and for producing an output when the data conforms to a predetermined condition, wherein the predetermined condition is data representing a succession of decreases in the light from the emitter received at the receiver the minimum values of which conform substantially to a curve of a type expected by the processor.

2. A device as claimed in claim 1, wherein the processor is a digital signal processor operative to process the data continuously according to an algorithm.

3. A device as claimed in claim 1, wherein the processor is a digital signal processor operative to process the data continuously according to an algorithm.

4. A device as claimed in claim 1 wherein the curve of a type expected by the processor comprises at least one of a polynomial and an approximately straight line.

5. A device as claimed in claim 1 wherein a light beam is passed from the light emitter to the light receiver such that, in use, the light beam is obstructed by a tool.

6. A method for processing an analogue signal resulting from light from an emitter falling on a light receiver of a tool analysis device for use on a machine tool, comprising the steps of:
  (i) converting the analogue signal into data having a numerical form which represents the signal;
  (ii) processing the data according to an algorithm; and
  (iii) producing an output signal when instructed by the algorithm when the data conforms to a predetermined condition, wherein the predetermined condition is data representing a succession of decreases in the light from the emitter received at the receiver the minimum values of which conform substantially to a curve of a type expected by the processor.

7. A method as claimed in claim 6 wherein said curve comprises at least one of a polynomial and an approximately straight line.

8. A method of analyzing a rotating tool, comprising the steps of:
- (i) taking a light emitter and a light receiver,
- (ii) passing a light beam from the light emitter to the light receiver, wherein the light receiver produces a signal indicative of the amount of light being received,
- (iii) moving a rotating cutting tool having at least one tooth into said light beam,
- (iv) determining at least one of minimum values and maximum values in the signal output by the light receiver as the at least one tooth of the rotating cutting tool interrupts the light beam,
- (v) comparing a plurality of said at least one of minimum values and maximum values determined in step (iv) to a predetermined condition, and
- (vi) issuing a trigger signal when a succession of said plurality of minimum values conform to said predetermined condition.

9. A method according to claim 8 wherein step (iv) comprises determining minimum values in the signal output by the light receiver as the at least one tooth of the rotating cutting tool interrupts the light beam.

10. A method according to claim 9 wherein step (v) comprises fitting a plurality of said minimum values to a polynomial expression.

11. A method according to claim 10 wherein the polynomial expression is derived from a previously acquired calibration curve.

12. A method according to claim 11 wherein step (vi) comprises issuing a trigger signal when the minimum values that are fitted to the polynomial cross a predetermined threshold.

13. A method according to claim 12 wherein step (vi) comprises performing an extrapolation to predict when said predetermined threshold will be crossed.

14. A method according to claim 8 wherein the signal output by the light receiver comprises a voltage signal.

15. A method according to claim 8 wherein step (v) comprises determining maximum values in the signal output by the light receiver as the at least one tooth of the rotating cutting tool interrupts the light beam.

16. A method according to claim 8 wherein the predetermined condition is selected such that a trigger signal is issued when the rotating tool is moved into the beam.

17. A method according to claim 8 wherein the predetermined condition is selected such that a trigger signal is issued when the rotation tool is moved out of the beam.

* * * * *